Jan. 12, 1926.
W. WAINIO
1,569,690
SELF CLEANING BERRY PICKER
Filed May 7, 1925
2 Sheets-Sheet 1
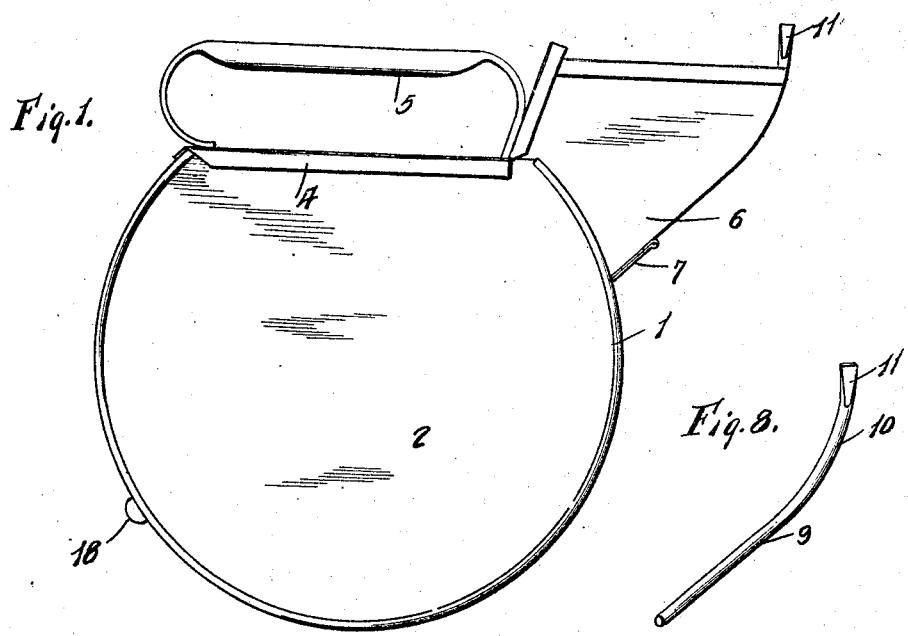
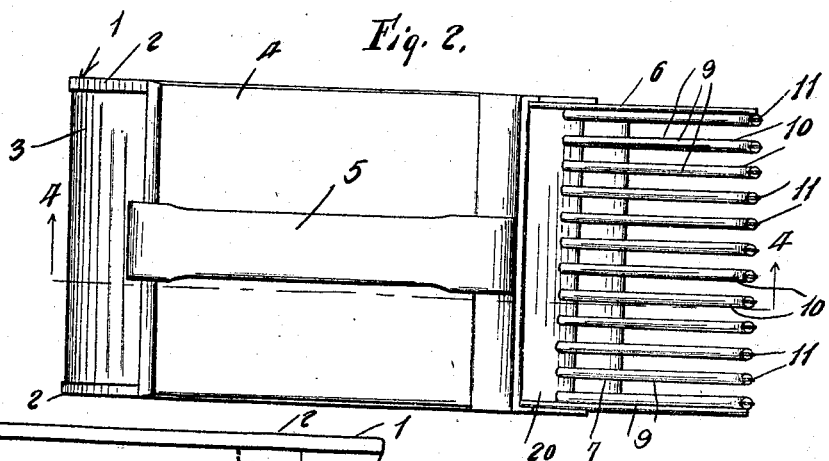
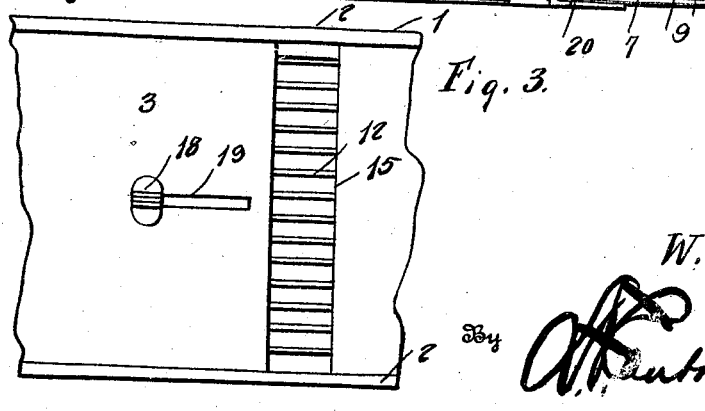
Inventor
W. Wainio, Jan. 12, 1926. 1,569,690

W. WAINIO

SELF CLEANING BERRY PICKER

Filed May 7, 1925 2 Sheets-Sheet 2

Inventor
W. Wainio,
By
Attorney

Patented Jan. 12, 1926.

1,569,690

UNITED STATES PATENT OFFICE.

WESTER WAINIO, OF WATTON, MICHIGAN.

SELF-CLEANING BERRY PICKER.

Application filed May 7, 1925. Serial No. 28,744.

*To all whom it may concern:*

Be it known that I, WESTER WAINIO, a citizen of Finland, residing at Watton, in the county of Baraga and State of Michigan, have invented certain new and useful Improvements in Self-Cleaning Berry Pickers; and I do hereby declare the following to be a full, clear, and exact description of the invention, such is will enable others skilled in the art to which it appertains to make and use the same.

The invention relates to devices for picking berries and has for its object the provision of means by which the berries may be separated from the stalks and delivered to a container with little or no trash.

Another object of the invention is the provision of a screen within the container and spaced apart from the bottom wall thereof so that any dirt or trash and small or imperfect berries that may enter the container will be separated from the perfect berries and may be delivered from the container through an opening in the wall.

The construction and operation and advantages of the invention will be described in detail hereinafter and will be found illustrated in the accompanying drawings, in which—

Figure 4:
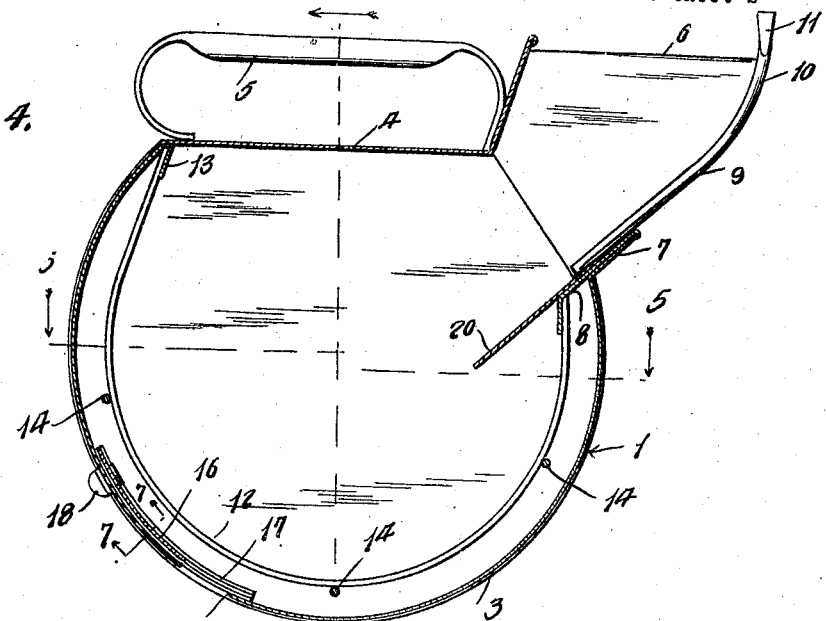
Figure 6:
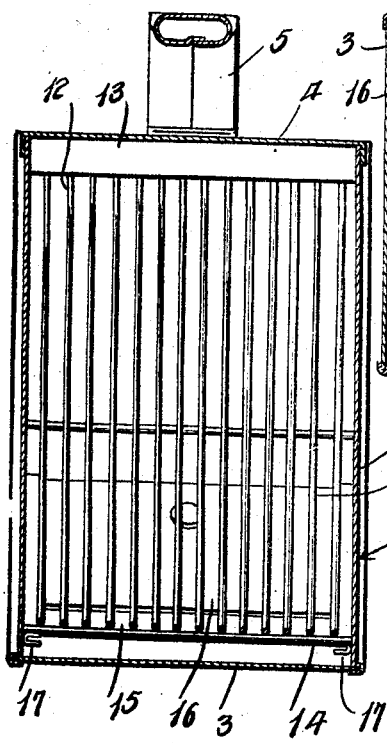
Figure 5:
Figure 7:
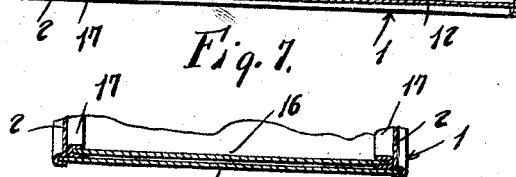

Figure 1 is a side view in elevation of the improved self-cleaning berry picker, Figure 2 is a top plan view thereof, Figure 3 a fragmental view of the bottom wall showing the opening therein for emptying dirt, trash, and imperfect berries, Figure 4 a sectional view on a plane indicated by the line 4—4 of Figure 2, Figure 5 a sectional view on a plane indicated by by the line 5—5 of Figure 4, Figure 6 a sectional view on the plane indicated by the line 6—6 of Figure 4, Figure 7 a sectional view on the plane indicated by the line 7—7 of Figure 4, and Figure 8 a detail of one of the picking fingers.

In the drawings, similar reference characters will be used to designate corresponding parts throughout the several views.

The invention comprises a casing 1 having substantially circular end walls 2 connected by a cylindrical wall 3, the upper portion of the casing being flattened as shown at 4 and having an operating handle 5 secured thereto.

Adjacent the flattened portion 4 is a nozzle 6 having its side walls and the wall adjacent the handle 5 imperforate, while the remaining wall is formed by a flange 7 formed by an extension of the wall 3 that is folded back on itself and extended inside of the container as shown at 8 for the purpose hereinafter to be described. Secured to flange 7 are a number of parallel fingers 9 preferably made of wire about one-eighth inch gauge and spaced apart from one another as shown, said wires forming picker fingers to separate the berries from the stalk. As shown, the picker fingers 9 have their upper ends curved backwardly toward the back wall of the nozzle 6 as shown at 10 and their extremities beveled as shown at 11.

Inside of the container 1 is provided a screen comprising a plurality of rods 12 bent to conform to the shape of the wall 3 and secured at one of their ends to the inwardly projecting portion 8, and having their other ends secured to an inwardly extending flange 13 at the other extremity of the wall 3, 14 indicating spacing bars secured transversely of the bars 12 at intervals as indicated. The purpose of the rods 12 is to form a screen inside of the container 1 to separate from the berries any dirt, trash, and small and imperfect berries that might be picked with the device, and an opening 15 is provided in the wall 3 through which the screenings may be dumped preliminary to dumping the perfect berries through the nozzle 6. 16 indicates a door slidably mounted in guides 17 to close the opening 15, 18 indicating a handle for door 16 slidably engaging a slot 19 in wall 3 and limiting the sliding movement of said door.

20 designates a lip secured to flange 7 and extending through the container 1 and is designed to prevent picked berries from being thrown out of the container in operating the device.

It will be understood that in operating the device, the container will be given a rocking movement and that the berries will be separated from the stalks on which they are growing by means of the fingers 9 and will drop into the container through the nozzle 6, the dirt, trash, and imperfect berries, as heretofore stated, passing through the screen formed by the bars 12 to be discharged through the opening 15 when the door 16 is open. The container may be emptied of the berries by inverting it so that the berries may run out through the nozzle into any suitable receptacle. If it is desired to discharge dirt and trash and imperfect berries with the perfect berries, the door 16 will be maintained in a closed position.

What is claimed is:—

1. A berry picker comprising a container having an opening in its bottom wall, a closure for said opening, a nozzle, parallel bars secured in said nozzle and constituting picking fingers, and a screen spaced from the bottom wall of the container.

2. A berry picker comprising a circular container having an opening in its circular wall, a closure for said opening, a screen in said container and spaced from said circular wall, a nozzle communicating with the container, and parallel bars secured to said nozzle and constituting picking fingers.

In testimony whereof I affix my signature.

WESTER WAINIO.